April 13, 1948.   L. MANNON   2,439,691
FILM CONTROL FOR AUTOMATIC SHUTTER ON MOVING PICTURE PROJECTOR
Filed Feb. 25, 1946   2 Sheets-Sheet 1
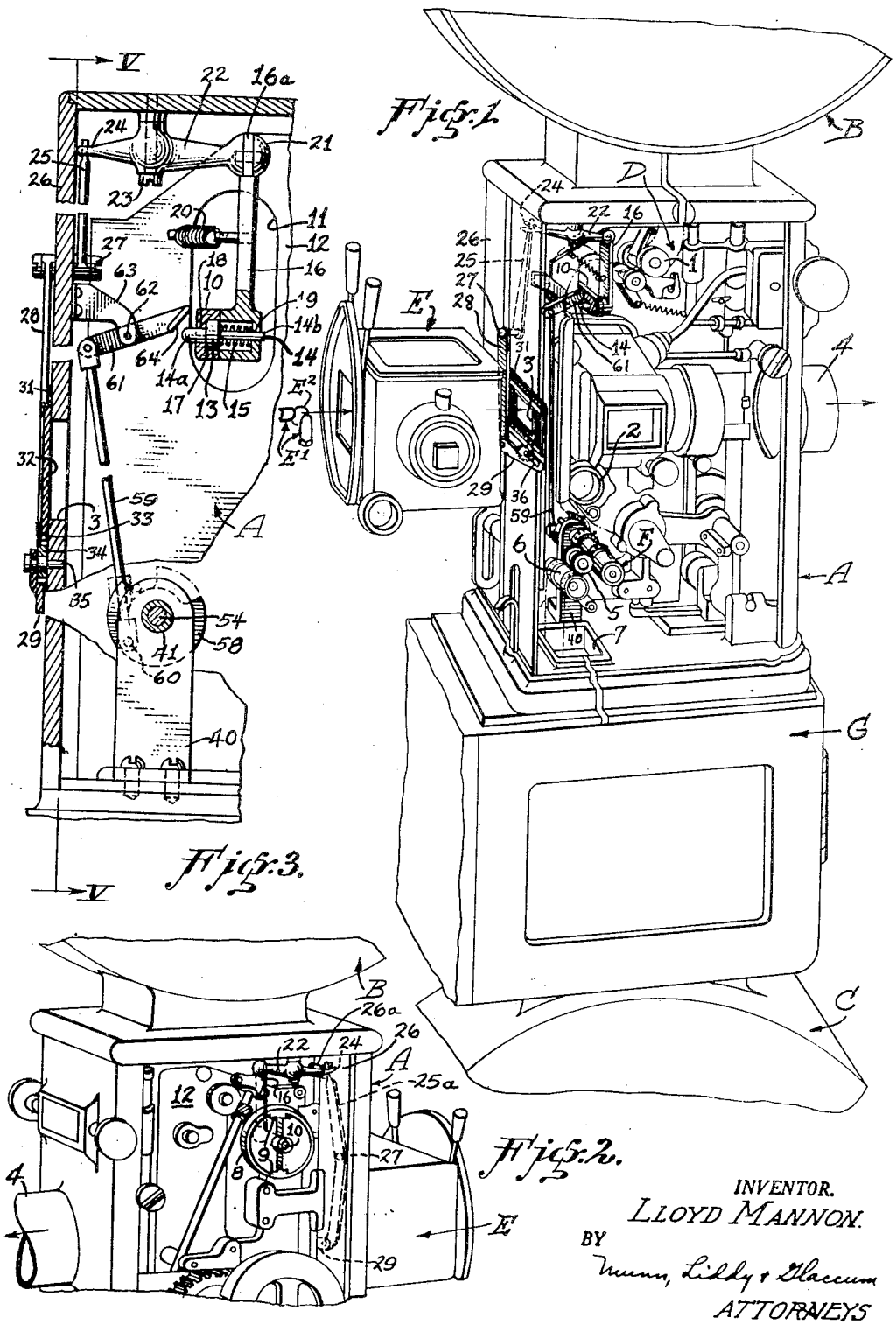
INVENTOR.
LLOYD MANNON.
BY
ATTORNEYS April 13, 1948. L. MANNON 2,439,691
FILM CONTROL FOR AUTOMATIC SHUTTER ON MOVING PICTURE PROJECTOR
Filed Feb. 25, 1946 2 Sheets-Sheet 2
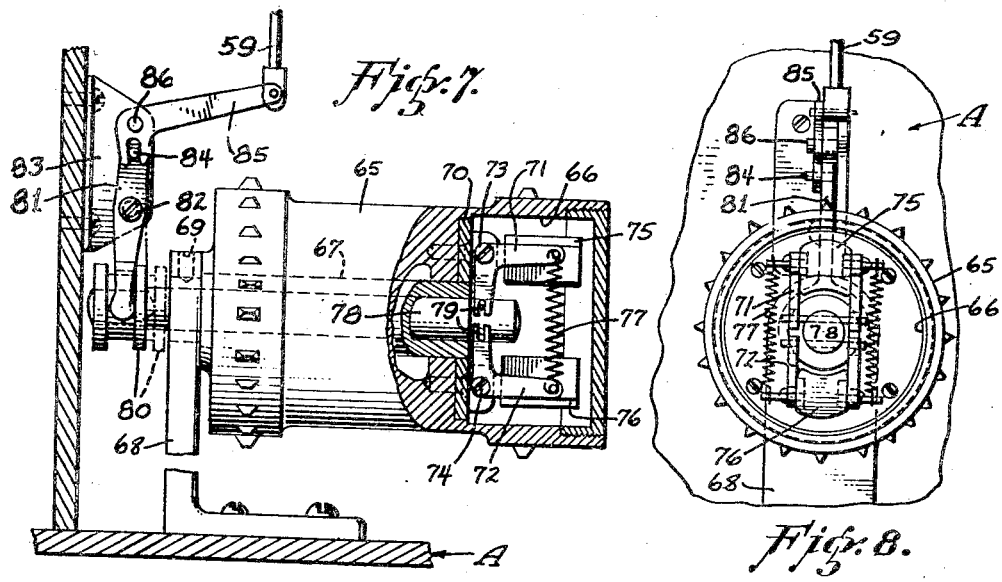
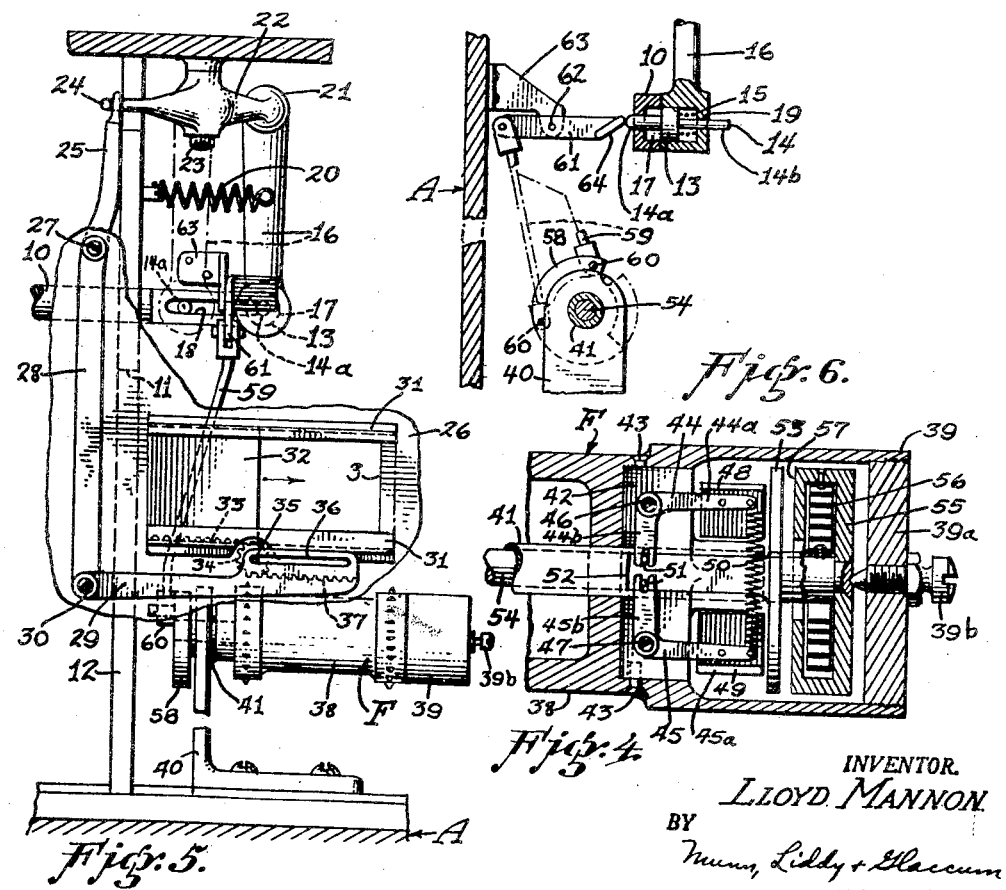
INVENTOR.
LLOYD MANNON
BY
ATTORNEYS.

Patented Apr. 13, 1948

2,439,691

UNITED STATES PATENT OFFICE 2,439,691

FILM CONTROL FOR AUTOMATIC SHUTTER ON MOVING PICTURE PROJECTOR

Lloyd Mannon, San Francisco, Calif.

Application February 25, 1946, Serial No. 650,009

6 Claims. (Cl. 88—17)

All commercial motion picture projectors are provided with governors for automatically moving a fire shutter over the lens aperture of the projector when the sprockets for advancing the film intermittently past the aperture slow down to a speed where it is not safe to expose the inflammable film to the intense heat from the light rays or when the projector stops operating for any reason.

An object of my invention is to provide a film control for an automatic shutter on a moving picture projector which is a modification of the form of the invention shown in my copending application on a film control automatic safety shutter for moving picture projectors, Serial No. 650,008, filed February 25, 1946. In the copending case I show automatic means actuated by the speed of the moving film for moving a fire shutter over the lens aperture when the movement of the film slackens below a predetermined speed or when the film breaks. In the present invention, I show an automatic shutter actuating means controlled by the speed of the film and this means cooperates with the mechanical shutter actuating means which is controlled by the stopping or a slowing down of the machine from operating. In other words, in the present invention the same shutter is actuated for closing the picture aperture when the machine ceases to operate or when the film moves at a speed less than that required for safety or when the film breaks.

The governor used for actuating the shutter when the film speed drops below a predetermined point is the same as that shown in my copending application. A different type of governor is also disclosed as a modified form of the present invention.

Other objects and advantages will appear in the following specification, and the novel features of the device will be particularly pointed out in the appended claims.

My invention is illustrated in the accompanying drawings forming a part of this application in which:

Figure 1 is a perspective view of a moving picture projector showing my invention operatively applied thereto;

Figure 2 is a perspective view taken from the opposite side of the projector to that shown in Figure 1 and illustrates the usual governor provided for actuating the fire shutter when the mechanism ceases to operate;

Figure 3 is an enlarged view of the shutter operating mechanism that is controlled by the speed of the film and portions of the mechanism are shown in section;

Figure 4 is a sectional view of the film controlled governor shown in my copending application;

Figure 5 is a vertical section taken along the line V—V of Figure 3;

Figure 6 is a view of a portion of Figure 3 and illustrates certain of the parts in a different position;

Figure 7 is a view of a modified form of governor, portions being shown in section for clarity; and Figure 8 is an end elevation of Figure 7 with the end cover, shown in Figure 7, removed.

While I have shown only the preferred forms of my invention, it should be understood that various changes or modifications may be made within the scope of the appended claims without departing from the spirit and scope of the invention.

In carrying out my invention, I make use of a motion picture projector indicated generally at A in Figures 1 and 2. The projector has a film feeding magazine B and a film take-up magazine C. A film D is fed from the upper magazine B and is passed around an upper feed sprocket 1. From the sprocket 1 the film is passed in front of a shutter mechanism indicated generally at E. An intermittent sprocket shown at 2 moves the film intermittently past a light opening 3 so as to cause the light rays to project the picture frames successively through the outlet lens assembly 4 onto the screen, not shown.

The film passes from the intermittent sprocket 2 to a combined spool and governor, indicated generally at F in Figure 1. From here the film passes around an idler 5 and then to a hold-back sprocket 6. The film then enters an opening 7 in the base of the projector and extends into the sound producing head, indicated generally at G. From here the film passes on into the lower magazine C. The parts thus far described, with the exception of the combined spool and governor F, form no part of my invention, except in so far as they cooperate with the parts now to be described. It might be stated here that the claims specific to the combination spool and governor F will be found in my companion case above referred to. In the present case, the combination spool and governor F will be referred to as governor means in the claims and will form a part of the combination that actuates the fire shutter hereinafter described, when the film drops below a predetermined speed, or when the film breaks.

At this time it is best to set forth generally how the slowing down of the mechanism of the projector will actuate the fire shutter. This part of the mechanism forms no part of my invention, but the fire shutter will be acted upon by the means already provided in the projector as well as by my invention. In Figure 2 a rotating wheel 8 is indicated as carrying weights 9 that are moved outwardly by centrifugal force when the wheel 8 attains a certain rotational speed. These weights 9 form a standard part of the projector and act on a shaft 10 to move the shaft longitudinally when the weights fly outwardly due to the rotation of the wheel.

Reference to Figure 1 shows the end of the shaft 10 and this shaft is moved toward the open side of the machine when the wheel 8 attains a predetermined rotational speed. The wheel 8 is mounted on one side of a central partition 12 and the shaft 10 projects through a slot 11 of the central partition, see Figure 3. The shaft 10 in Figure 3 is shown carrying the head 13 of a spring-pressed plunger 14. The plunger is carried by a vertically extending arm 16 and a spring 15 urges the head 13 into a recess 17 provided in the end of the shaft 10. Figure 5 shows the shaft 10 extending through the partition 12 and being slotted at 18 so as to slidably receive the portion 14a of the plunger 14. The other end 14b of the plunger is slidably received in an opening 19 provided in the lower end of the arm 16, see Figure 3.

Normally the head 13 is received in the recess 17 so that the shaft 10 and the arm 16 are locked together and will move as a unit. A coil spring 20 acts on the arm 16 to move it toward the partition 12, see Figure 5. The upper end of the arm has a reduced portion 16a, see Figure 3, for being rigidly received in the enlarged end 21 of a lever 22. The lever is rotatably mounted on a cap screw 23, see Figure 3, and the other end of the lever is forked as at 24.

Referring to Figures 1 and 5, it will be seen that the forked end 24 of the lever 22 actuates an arm 25 that is disposed on the inner surface of the projector wall 26. The arm 25 is pivoted at 27 and the pivotal point extends through the wall 26 and has an arm 28 connected thereto. The two arms 25 and 28 are clearly shown in Figure 5. Figure 2 shows how the forked end 24 of the lever 22 may extend through a slot 26a in the wall 26 so that the arms 25 and 28 may be made a lever 25a and actuate an arm 29. The arm 28 is pivoted to an arm 29 at 30, see Figure 5. The wall 26 has the opening 3 therein and this opening has horizontally disposed guide channels 31 disposed above and below the horizontal edges of the opening. A fire shutter 32 is slidably mounted in the guide channels 31 and the lower edge of the shutter carries a rack 33 that meshes with a pinion 34. The pinion has its shaft 35 rotatably mounted in the wall 26 and the outer end of the shaft is slidably received in a slot 36 provided in the arm 29. The arm 29 also has a rack 37 that meshes with the pinion 34. From this construction, it will be seen that when the spring 20 moves the arm 16 toward the partition 12, note the dot dash line position in Figure 5, the lever 22 will be rocked about its pivot and will swing the arms 25, 28 and 29 to cause the rack 37 to rotate the pinion, whereby the pinion will move the rack 33 and the shutter 32 into a position to uncover the aperture 3. Figure 5 indicates the opening 3 uncovered which will be the case when the projector is operating. Light rays from the shutter mechanism E can now pass through the opening 3 to illuminate the picture frames on the film.

Should there be a failure of the operating mechanism for any reason, the wheel 8 will either slow down or stop rotating and the weights 9 will move the shaft 10 to the left in Figure 5 and cause the lever 22 to swing the arms 25 and 28 for moving the fire shutter across the opening 3. The intense heat from the light caused by the carbons will be shut off from the film and the film will therefore not catch on fire.

My invention contemplates the moving of the fire shutter into closed position should the speed of the film drop below a predetermined point, or should the film break. I make use of the governor F shown and claimed in my copending application and this governor is illustrated in Figure 4. The combination spool and governor F has a spool portion 38 for receiving the film and a casing extension 39 for receiving the governor mechanism. Figure 5 illustrates a support 40 for a hollow shaft 41 that is rigidly secured to the support 40. A base 42 is mounted on the hollow shaft 41 and is disposed within the casing 39. Set screws 43 cause the base to rotate with the spool 38 and casing 39. The base 42 has two flat sides and pairs of bell-crank levers 44 and 45 mounted on the flat faces are pivoted at 46 and 47, respectively. The ends 44a and 45a of the bell-crank levers carry fly-weights 48 and 49, respectively. Coil springs 50 urge the weights toward each other.

The other ends 44b and 45b of the levers are forked and engage with pins 51 that are mounted on fingers 52, which in turn are carried by a friction disc 53, the disc being slidably mounted on the hollow shaft 41. A solid shaft 54, see Figure 3, is rotatably mounted within the hollow shaft 41 and carries a case 55 in which a coil spring 56 is mounted. One end of the spring is secured to the casing while the other end is secured to the shaft 41, see Figure 4. The casing 55 has a friction face 57 that is adapted to be frictionally engaged by the disc 53. The disc 53 and the face 57 form a friction clutch.

The structure is such that when the spool 38 attains a certain speed of rotation, the weights 48 and 49 will fly outwardly and through the pairs of levers 44 and 45 will move the fingers 52 and cause the clutch member 53 to engage with the clutch face 57 and to impart a rotation to the casing 55. This rotation will rotate the shaft 54 and will wind up the spring 56. Figures 3 and 5 show the shaft 54 connected to an eccentric 58. This eccentric has a link 59 pivoted thereto at 60 and the other end of the link is pivoted to a finger 61, which in turn is pivotally mounted at 62 to a bracket 63. The finger 61 has a cam-shaped end 64 that is disposed above the end portion 14a of the spring-pressed plunger 14 when the latter is in the position shown in Figure 5 and when the fire shutter 32 is held in open position.

Should for any reason the film slow down to too slow a speed, or should the film break and the projector mechanism still continue to function, the spool 38 would either slow down or stop entirely upon breakage of the film and permit the springs 50 to return the fly-weights 48 and 49 to normal position. Such a movement will disengage the friction disc 53 from the friction face 57 of the casing 55 and permit the coil spring 56 to return the casing to its normal position. The rotation of the casing will cause the shaft 54 to rotate and to swing the eccentric 58 into the full line position shown in Figure 6. The eccentric will raise the link 59 and swing the finger 61 for causing its cam portion 64 to depress the plunger 14 and move the head 13 out of the recess 17. The arm 16 is now freed from the shaft 10 and will be moved toward the partition 12 by the spring 20. The end 14a of the plunger will ride in the slot 18 during this movement. The arm in moving will swing the lever 22 and will cause the arms 25, 28 and 29 to move the fire shutter 32 into closed position. This movement instantly takes place upon failure of the film, even though the moving picture mechanism still continues to function. The closing of the opening 3 of the fire shutter prevents the film from catching fire.

When the moving picture projecting mechanism is brought to a stop, the shaft 10 will be moved to the left in Figure 5 and will carry the recess 17 into alignment with the head 13. As soon as this occurs the spring-pressed plunger 14 will move the head 13 back into the recess 17 for again locking the parts together. It will be seen from this that the fire shutter is instantly closed upon failure of the mechanism of the projector to operate and also upon failure of the film in either slowing down or in breaking. The fire shutter is therefore actuated by a dual automatic control. Figure 4 shows the casing extension 39 closed by a removable cover 39a and the cover carries a set screw 39b that engages with the end of the shaft 54.

When the arm 16 is again locked to the shaft 10, the finger 61 will still remain in the full line position shown in Figure 6 and will block the movement of the shaft 10 to the right in Figure 5 until the machine gains sufficient speed to prevent the film from catching on fire as it passes the opening 3. The pin 14 will contact with the side of the finger 61 and the arm 16 cannot move away from the wall 12 until the spool 38 reaches the proper speed. When this occurs, the governor F will raise the finger 61 out of the path of the pin 14 and the parts will assume the position shown in Figure 3.

In Figures 7 and 8, I show a modified form of governor. In this form of the device, the film spool 65 takes the place of the spool 38 and it has a compartment 66 therein. The spool 65 is rotatably mounted on a hollow shaft 67, which is rigidly held in place on a support 68 by a set screw 69. A disc 70 is secured to the spool 65 and is mounted in the compartment 66. The disc carries two pairs of bell-crank levers 71 and 72. These are pivoted at 73 and 74. Fly-weights 75 and 76 are carried by the bell-crank levers and are urged toward each other by coil springs 77.

A shaft 78 is slidably mounted in the hollow shaft 67 and has pins 79 that are engaged by the forked ends of the bell-crank levers 71 and 72. The rotation of the spool 65 will cause the weights 75 and 76 to fly outwardly and move the shaft 78 to the right in Figure 7. The shaft carries a collar 80 in which the end of a lever 81 rides. The lever is pivoted at 82 to a bracket 83 and the other end of the lever is pivoted at 84 to the short end of a bell-crank lever 85. The lever 85 is pivoted at 86 to the bracket 83 and the long arm of the lever 85 has the link 59 connected thereto.

A movement of the shaft 78 to the right in Figure 7, will swing the bell-crank lever 85 clockwise and will lower the link 59 for swinging the finger 61 out of the path of the spring-pressed plunger 14. The modified form will therefore operate the finger in the same manner as the preferred form and no further description need be given.

I claim:

1. The combination with a moving picture projector including an opening past which a film is intermittently moved, a source of light rays directed through the opening for projecting pictures from the film onto a screen, a fire shutter for closing the opening for protecting the film from the light rays, and governor controlled means actuated by the moving picture projector mechanism for opening the fire shutter when the mechanism attains a predetermined speed and for automatically closing the shutter when the mechanism drops below this speed or stops; of auxiliary means actuated by the speed of the film moving through the projector for keeping the shutter closed until the film has reached the required speed for safety, whereupon the means permits the shutter to be opened by the governor means, and for closing the shutter automatically should the film slow down below a predetermined speed or should the film break.

2. The combination with a moving picture projector having a film feeding mechanism, an opening past which the film is intermittently moved and through which the light rays are directed for projecting the film pictures on a screen, a fire shutter for the opening, means for opening and closing the shutter and including an arm, a reciprocable shaft, means connecting the shaft to the arm, a governor operated by the mechanism and actuating the shaft for causing the arm to open the shutter when the mechanism attains a desired speed, of a spool rotated by the moving film, a second governor operated by the spool, and releasing means actuated by the second governor when the spool rotates below a predetermined speed or stops for freeing the connecting means between the shaft and arm so that the arm can move independently of the shaft, and a spring for moving the freed arm for causing it to actuate the shutter closing means for closing the shutter and protecting the film from the light rays.

3. In combination, a reciprocable shaft, a governor actuated by a moving picture projector mechanism for reciprocating the shaft, a fire shutter for closing a film opening, a lever operatively connected to the fire shutter for opening and closing it, an arm carried by one end of the lever, a spring-pressed plunger carried by the arm and having a head for connecting the arm with the shaft, said shaft having a recess for receiving the head, whereby the shaft and arm are locked together as a unit, a spool rotated by a moving film, a second governor mounted in the spool, a finger for moving the plunger for disconnecting the head from the shaft for freeing the arm, means actuated by the second governor for causing the finger to move the plunger to free the arm from the shaft, and a spring for moving the arm in a direction to actuate the lever and close the fire shutter.

4. In combination, a reciprocable shaft, a governor actuated by a moving picture projector mechanism for reciprocating the shaft, a fire shutter for closing a film opening, a lever operatively connected to the fire shutter for opening and closing it, an arm carried by one end of the lever, a spring-pressed plunger carried by the arm and having a head for connecting the arm with the shaft, said shaft having a recess for receiving the head, whereby the shaft and arm are locked together as a unit, a spool rotated by a moving film, a second governor mounted in the spool, a finger for moving the plunger for disconnecting the head from the shaft for freeing the arm, means actuated by the second governor for causing the finger to move the plunger to free the arm from the shaft, a spring for moving the arm in a direction to actuate the lever and close the fire shutter, the first governor moving the shaft when the mechanism stops for aligning the shaft recess with the plunger head whereby the head will be received in the recess and will connect the shaft and arm together, the second governor through its associate means holding the finger in the path of the plunger for preventing the shaft and arm from opening the shutter until the film has attained a predetermined speed, the second governor moving the finger out of the path of the plunger as it is moved by the shaft when the film attains a speed to rotate the spool and actuate the second governor.

5. The combination with a moving picture projector having a film feeding mechanism, an opening past which the film is intermittently moved and through which the light rays are directed for projecting the film pictures on a screen, a fire shutter for the opening, means for opening and closing the shutter and including an arm, a reciprocable shaft, means connecting the shaft to the arm, a governor operated by the mechanism and actuating the shaft for causing the arm to open the shutter when the mechanism attains a desired speed, of a spool rotated by the moving film, a second governor operated by the spool, and releasing means actuated by the second governor when the spool rotates below a predetermined speed or stops for freeing the connecting means between the shaft and arm so that the arm can move independently of the shaft, and a spring for moving the freed arm for causing it to actuate the shutter closing means for closing the shutter and protecting the film from the light rays, said releasing means holding the shaft and arm connecting means so the shaft and arm cannot be moved by the first governor to open the shutter until the film has brought the spool up to the desired speed, whereupon the second governor will free the releasing means from the shaft and arm connecting means and permit the first governor to open the fire shutter.

6. In combination, a governor rotated by a moving picture mechanism, a shaft moved longitudinally when the governor is rotated, a shutter-actuating arm, a spring-pressed plunger normally interconnecting the shaft and arm to hold the shutter open when the governor is rotating at a predetermined speed, a spool rotated by a moving film, a finger, and means actuated by the spool for moving the finger to move the plunger for disconnecting the arm from the shaft when the film movement drops below a predetermined speed or breaks, and spring means for causing the arm to close the shutter when the arm is freed.

LLOYD MANNON.

REFERENCES CITED

The following references are of record in the file of this patent:

UNITED STATES PATENTS

| Number | Name | Date |
| --- | --- | --- |
| 1,455,095 | Roebuck | May 15, 1923 |
| 1,537,830 | Kiral | May 12, 1925 |
| 1,628,258 | Malm | May 10, 1927 |

FOREIGN PATENTS

| Number | Country | Date |
| --- | --- | --- |
| 381,241 | Germany | Sept. 18, 1923 |
| 455,280 | France | May 20, 1913 |